United States Patent [19]

Abbiss et al.

[11] Patent Number: 5,055,692
[45] Date of Patent: Oct. 8, 1991

[54] SYSTEM FOR MEASURING AMBIENT PRESSURE AND TEMPERATURE

[75] Inventors: John B. Abbiss, Irvine; Medhat Azzazy, Laguna Niguel, both of Calif.; Robert W. McCullough, Princeton Junction, N.J.; Anthony E. Smart, Costa Mesa, Calif.

[73] Assignee: The Titan Corporation, San Diego, Calif.

[21] Appl. No.: 402,124

[22] Filed: Sep. 1, 1989

[51] Int. Cl.[5] .......................... G01J 1/42; G01N 21/64
[52] U.S. Cl. ................................ 250/372; 250/336.1; 250/458.1; 250/459.1; 356/73
[58] Field of Search ............... 250/372, 336.1, 458.1, 250/459.1, 461.1, 361 R; 356/72, 73; 374/161

[56] References Cited

U.S. PATENT DOCUMENTS

| | | | |
|---|---|---|---|
| 4,303,862 | 12/1981 | Geiger | 250/372 |
| 4,483,614 | 11/1984 | Rogers | 356/318 |
| 4,572,667 | 2/1986 | Rogers | 356/317 |
| 4,652,143 | 3/1987 | Wickerscheim et al. | 250/458.1 |

Primary Examiner—Janice A. Howell
Assistant Examiner—Richard Hanig
Attorney, Agent, or Firm—Ellsworth R. Roston; Charles H. Schwartz

[57] ABSTRACT

A source produces light, preferably in a wavelength band of approximately 185-200 nm and in pulses at a suitable frequency (e.g., 100 Hz). The light may be directed in a progressively diverging beam into the atmosphere for a Rayleigh scattering by molecules in the atmosphere in the 185-200 nm wavelength band and for fluorescence by particular molecules (e.g. oxygen) in the atmosphere in another wavelength band (e.g. 210-260 nm). The Rayleigh scattered light and the fluorescent light may pass in a progressively converging beam to two detectors, one responsive to the Rayleigh scattered light to produce first signals and the other responsive to the fluorescent light to produce second signals. Optical elements may prevent the second detector from responding to the fluorescent light and the second detector from responding to the scattered Rayleigh light. A data processor processes the first and second signals to provide outputs representative of the atmospheric pressure and temperature. These outputs may have a great accuracy, in part by regulating the characteristics of the light source and the first and second detectors at times between the successive light pulses from the source. The progressively diverging and progressively converging beams may have a focal point displaced externally of the housing by at least a particular distance to avoid effects of turbulence when the housing is in a moving vehicle.

26 Claims, 2 Drawing Sheets

SYSTEM FOR MEASURING AMBIENT PRESSURE AND TEMPERATURE

This invention relates to apparatus for measuring temperature and pressure in the atmosphere. More particularly, the invention relates to apparatus in which the temperature and pressure of the atmosphere are measured simultaneously from the same light source. The invention also relates to a method of measuring temperature and pressure in the atmosphere.

In vehicles such as aircraft, such parameters as the temperature and pressure of the atmosphere around the aircraft have a significant effect on the flight of the aircraft. For example, such parameters have an effect on the speed of the aircraft relative to the ground. It is accordingly important to provide accurate measurements of such parameters as the temperature and pressure of the atmosphere around the aircraft.

It is not easy to provide accurate measurements of such parameters as the temperature and pressure of the atmosphere around an aircraft. One reason is that the movement of the aircraft through the atmosphere produces a turbulence of the atmosphere around the aircraft. This turbulence affects the temperature and pressure of the atmosphere around the aircraft and prevents accurate measurements of the temperature and pressure of the atmosphere around the aircraft from being obtained.

Equipment is in use for measuring the temperature and pressure of the atmosphere around a moving vehicle such as an aircraft. Such equipment has several disadvantages. One disadvantage is that the equipment is affected by the turbulence of the atmosphere around the aircraft. This prevents the equipment from providing accurate measurements of the temperature and pressure of the atmosphere around the aircraft. Another disadvantage is that the measurements of the atmospheric temperature and pressure are slow. This prevents the aircraft from having instantaneously updated measurements of temperature and pressure. A further disadvantage is that one equipment has to be provided to measure atmospheric temperature and separate equipment has to be provided to measure atmospheric pressure. A further disadvantage is that holes have to be provided in the skin of the aircraft to receive probes and antennae used in such equipment. Such holes affect the smooth contour of the aircraft and limit the speed of the aircraft.

The need to provide equipment for accurately measuring such parameters as temperature and pressure of the atmosphere around a moving vehicle such as an aircraft has been known for some time. If anything, the need has increased through the years because of the increased speed provided in the aircraft and the increased precision of operation desired in the aircraft. A considerable effort has been made, and significant amounts of money have been expended, to provide equipment which will provide accurate measurements of temperature and pressure without any of the disadvantages discussed in the previous paragraph. In spite of such efforts and such money expenditures, the problems discussed in the previous paragraph still persist.

This invention provides equipment which accurately measures temperature and pressure of a moving vehicle such as an airplane. For example, the equipment of this invention is able to provide such measurements with an error less than one percent (1%). The equipment of this invention provides the measurements at a position sufficiently removed from the skin of the aircraft so that the measurements are not affected by the turbulence produced in the atmosphere by the movement of the aircraft. In this invention, the same equipment provides the measurements of temperature as provides the measurements of pressure. Furthermore, the measurements are quite rapid. For example, in one embodiment of the invention, measurements of temperature and pressure are made as often as fifty (50) Hertz. This causes the measurements of temperature and pressure to be instantaneously updated.

In one embodiment of the invention, a source produces light, preferably in a wavelength band of approximately 185-200 nm and preferably in pulses at a suitable frequency (e.g., 100 Hz . The light may be directed in a progressively diverging beam into the atmosphere for a Rayleigh scattering by molecules in the atmosphere in the 185-200 nm wavelength bank and for fluorescence by particular molecules (e.g. oxygen) in the atmosphere in another wavelength band (e.g. 210-260 nm).

The Rayleigh scattered light and the fluorescenct light may pass in a progressively converging beam to two detectors, one responsive to the Rayleigh scattered light to produce first signals and the other responsive to the fluorescenct light to produce second signals. Optical elements may prevent the second detector from responding to the scattered Rayleigh light.

A data processor processes the first and second signals to provide outputs representative of the atmospheric pressure and temperature. These outputs may have a great accuracy, in part by regulating the characteristics of the light source and the first and second detectors at times between the successive light pulses from the source.

The source and the detectors may be disposed in a housing filled with a suitable inert gas (e.g. nitrogen) at a suitable pressure (e.g. less than atmospheric). The progressively diverging and progressively converging beams may have a focal point displaced externally of the housing by at least a particular distance to avoid effects of turbulence when the housing is in a moving vehicle.

Figure 1:
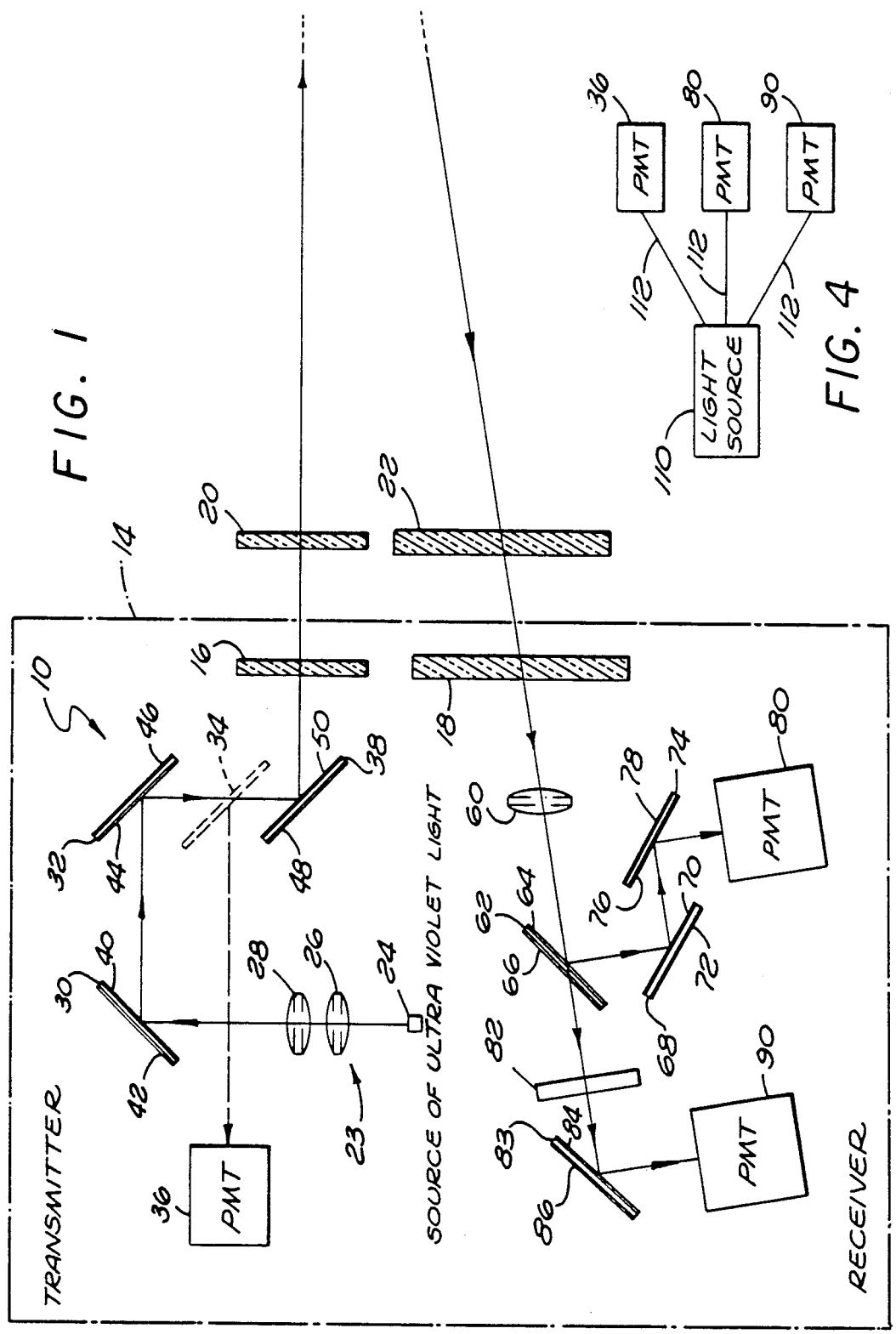
FIG. 1 is a schematic view of a system for measuring the temperature and pressure of the atmosphere around a moving vehicle such as an aircraft.
Figure 3:
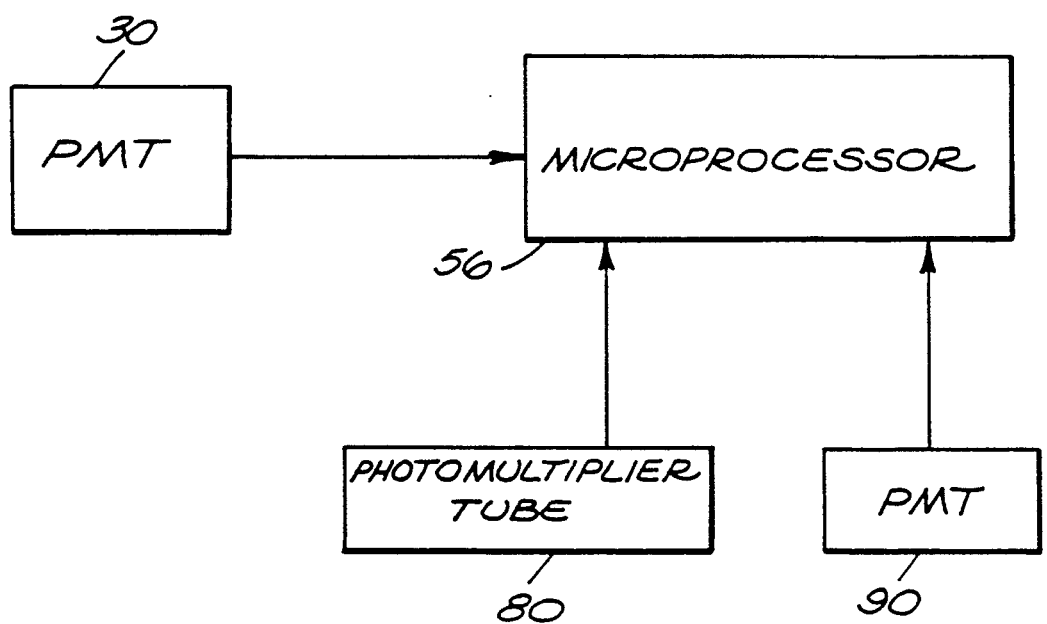

FIG. 3 is a fragmentary perspective view of the vehicle and the housing for the system of FIG. 1 and further illustrates the shape of the light beam passing from the housing through the vehicle into the atmosphere and the light beam scattered by elements in the atmosphere for passage through the vehicle to the housing; and FIG. 4 schematically illustrates a sub-system for regulating the output measurements representing temperature and pressure.

In one embodiment of the invention, apparatus generally indicated at 10 in FIG. 1 is provided for measuring the temperature and pressure of a moving vehicle 12 such as an aircraft 12. The apparatus 10 is adapted to be disposed within a housing or enclosure 14 (FIG. 3) in the vehicle 12. It will be appreciated, however, that the vehicle 12 does not have to be moving and that the apparatus 10 may be disposed in other types of equipment than vehicles.

The housing 14 (FIG. 3) is adapted to be filled with an inert gas such as dry nitrogen. Preferably the inert gas is at a pressure less than atmospheric. For example, the pressure of the gas may be one half of one atmosphere. Windows 16 and 18 are provided in the housing 14 and may be respectively disposed adjacent windows 20 and 22 in the vehicle 12. The windows 16, 18, 20 and 22 may be made from a clear quartz, preferably an ultraviolet grade quartz. The windows 16 and 18 may be respectively provided with diameters such as about one and one half inches (1.5") and two and one half inches (2.5") and may be separated from each other by a suitable distance such as approximately four inches (4"). This distance is chosen so that data will not be obtained too close to the vehicle 12 since data obtained too close to the window will be affected by the turbulence of the atmosphere adjacent to the vehicle 12 when the vehicle is moving.

An optical system generally indicated at 23 is disposed within the housing 14. The optical system 24 includes a light source 24, preferably a 60-watt xenon flashlamp source. Such a source is preferably provided with a sapphire window and is preferably pulsed at a suitable frequency such as approximately one hundred Hertz (100 Hz). The light from the source 24 is introduced to a pair of lenses 26 and 28. Each of the lenses 26 and 28 is preferably provided with a suitable diameter such as approximately one inch (1") and with a suitable focal length such as approximately forty five millimeters (45 mm). Each of the lenses 26 and 28 may be made from a suitable material such as an ultra-violet grade quartz and is preferably biconvex. Two lenses 26 and 28 are preferably used to reduce spherical aberration.

The radiation passing through the lenses 26 and 28 is introduced to a dichronic mirror 30 which reflects the radiation to a dichroic mirror 32. The mirror 32 in turn reflects the radiation to a half silvered mirror 34. Half of the radiation is accordingly reflected by the mirror 34 to a photomultiplier tube 36. The other half of the radiation passes through the mirror 34 to a dichroic mirror 38. The mirror 38 in turn reflects the radiation so that the radiation passes through the window 16 in the housing 40 and the window 20 in the skin of the vehicle 12 into the atmosphere. The mirrors 30, 32, 34 and 38 are preferably made from an ultraviolet grade quartz.

Each of the dichroic mirrors 30, 32 and 38 is provided with coatings on opposite sides of the mirror. The dichroic mirror 30 has on one side a coating 40 with characteristics to pass radiation in a broad band such as approximately 180-280 nm and with a coating 42 on the other side to pass radiation in a band in which the median wavelength is about 191.5 nm. The dichroic mirror 32 has coatings 44 and 46 on opposite surfaces with passbands respectively corresponding to the passbands of the coatings 40 and 42. In like manner, the dichroic mirror 38 has coatings 48 and 50 on opposite surfaces with passbands respectively corresponding to the passbands of the coatings 40 and 42. In this way, the dichroic mirrors 30, 32 and 38 operate to pass radiation into the atmosphere only in a particular band of wavelengths such as approximately 185-200 nm.

The radiation introduced into the atmosphere from the mirrors 30, 32 and 38 are subjected to Rayleigh scattering by free molecules in the atmosphere. Rayleigh scattering does not produce a change in the wavelength pass band of the radiation. The magnitude of this "elastic" scattering is proportional to $1/\lambda 4$, where $\lambda$ is the wavelength of the light. This may be considered as a constant in view of the fact that the wavelength pass band is relatively narrow and is fixed. The amount of light scattered is also proportional to the number of free molecules in the volume being sensed in the atmosphere. As a result, the amount of light scattered without a change in frequency is proportional to the air density—or, in other words, to the atmospheric pressure.

When the temperature of the atmosphere is known, the atmospheric pressure may be accordingly determined in a microprocessor 56 from measurements made of the amount of light scattered in the 185-200 nm pass band. Since molecular backscattering is inversely proportional to the fourth power of the wavelength, the strongest signals of such backscattering can be obtained at the blue end of the spectrum and even stronger signals can be obtained in the ultraviolet rang of wavelengths.

When the light passing through the windows 16 and 20 impinges upon an oxygen molecule in the atmosphere, the oxygen molecule absorbs an ultraviolet photon. One of several events can then occur. The most likely event is that the oxygen molecule becomes disassociated into two (2) excited atoms of nascent oxygen. When this occurs, the oxygen molecule becomes essentially lost to any useful measurement. About ninety five percent (95%) of the events involving oxygen molecules are of this type.

The remainder of the oxygen molecules absorb photons and become excited into a higher electronic state. This state subsequently decays, causing the oxygen molecule to emit a photon of a longer wavelength than the wavelength of the light impinging upon the oxygen molecule. This wavelength is in the range of about 210-260 nm. The number of photons emitted by the fluorescent process described in this paragraph depends upon the initial state of excitation of the atmospheric oxygen. This initial state of excitation of the oxygen is a function of the temperature of the oxygen.

As a result, the proportion of light emitted in the atmosphere with wavelengths in the range of about 210-260 nm depends primarily upon the temperature of the atmosphere. It also depends, of course, upon the concentration of the molecules in the atmosphere, as indicated by the Rayleigh scattering discussed previously. Although ninety five percent (95%) of the light impinging on the oxygen molecules does not produce a radiation of photons, the radiation of photons from the oxygen atoms produces a signal with a higher magnitude than the signal produced by the Rayleigh scattering. Although it provides only a second order signficance relative to the measurement of the radiation in the wavelength of approximately 210-260 nm, the effect of absorption on the radiation by the oxygen molecules should be evaluated either to provide a small corrective calibration or to show that it is negligible.

The scattered light in the wavelength band of approximately 185-200 nm and the radiation in the shifted wavelength band of approximately 210-260 nm pass through the window 22 in the skin of the aircraft 12 and the window 18 in the housing 14 to a lens 60. The lens 60 may be made from the same ultraclear quartz material as the lenses 26 and 28. The lens 60 is provided with characteristics to shape the light passing through the windows 22 and 18 so that the path of the light corresponds to the path of the light from the source 24.

The light passing through the lens 60 is introduced to a half-silvered dichroic mirror 62 having coatings 64 and 66. The coating 64 is provided with characteristics to reflect light at a median pass band of approximately 191.5 nm. The coating 66 is provided with broad band characteristics to pass light in a wavelength passband of approximately 180–280 nm. In this way, the mirror 62 reflects the light with the Rayleigh scattering in a pass band of approximately 185–200 nm and passes the light in the shifted passband f approximately 210–260 nm.

The light reflected by the mirror 62 is introduced to a dichroic mirror 68 having coatings 70 and 72 on its opposite surfaces. The coating 70 is provided with characteristics to reflect light at a median passband of approximately 191.5 nm. The coating 72 has broadband characteristics to pass light in a wavelength range of approximately 180–280 nm. The light reflected by the mirror 68 then passes to a mirror 74 having coatings 76 and 78 with characteristics respectively corresponding to the characteristics of the coatings 70 and 72 on the mirror 68. The light reflected by the mirror 74 then passes to a photomultiplier tube 80 which may have a photocathode made from a suitable material such as rubidium telluride. In this way, the photomultiplier tube 80 produces a signal representative only of the light scattered by the Rayleigh effect in the waveband range of approximately 185–200 nm.

The light passing through the half silvered mirror 62 is introduced to a filter 82 which entraps the light in the wavelength range of approximately 185–200 nm and passes the light only in the shifted wavelength range of approximately 210–260 nm. This light then passes to a dichroic mirror 83 having coatings 84 and 86. The coating 84 is provided with characteristics to reflect light at a median wavelength of approximately 248 nm. The coating 86 is provided with characteristics to pass light in a broad wavelength passband of approximately 180–280 nm. The light reflected by the mirror 83 is introduced to a photomultiplier tube 90 which may be provided with a photocathode made from a suitable material such as rubidium telluride. In this way, the light passing to the photomultiplier tube 90 is only in the shifted wavelength passband of approximately 210–260 nm.

The signals produced in the photomultiplier tubes 80 and 90 are introduced to the microprocessor 56. The microprocessor 56 process the signals from the photomultiplier tubes 80 and 90 to provide first output indications representing the temperature of the atmosphere around the vehicle 12 and second output indications representing the pressure of the atmosphere around the vehicle 12. The microprocessor 56 also operates to produce timing signals which control the pulsing of the light source 24.

As previously indicated, the movement of the vehicle 12 through the atmosphere produces turbulence in the atmosphere around the vehicle. This turbulence tends to affect the measurements of temperature and pressure in the atmosphere if the measurements are made too close to the vehicle. In the embodiment of the invention described above, the measurements are made outside of the range of turbulence. This is accomplished by providing the lenses 26 and 28 with characteristics to diverge the light from the source 24 at a particular angle, as indicated at 100 in FIG. 3, and to converge at a particular angle, as indicated at 102 in FIG. 3, the light beam passing into the housing through the windows 22 and 18.

Figure 2:
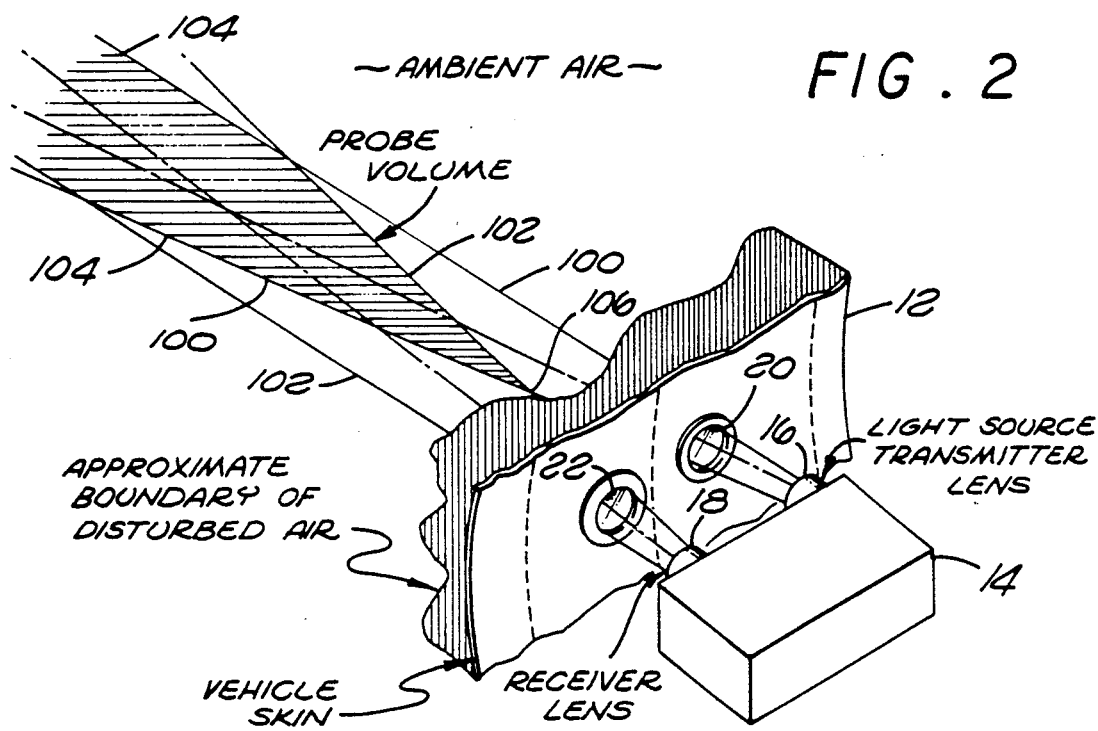
FIG. 2 is a block diagram of electrical circuitry associated with the system of FIG. 1 for measuring the temperature and pressure of the atmosphere around the moving vehicle.

As illustrated in FIG. 2, the area common to the diverging beam 100 and the converging beam is indicated as a cross hatched area. This area has a focus 106 at a position external to the skin of the housing 12. By providing the diverging beam 100 and the converging beam 102 with characteristics to dispose the focus 106 at a position beyond the turbulence in the atmosphere, the measurements made by the apparatus 10 are not affected by such turbulence. The focus 106 is preferably disposed about one half of a meter (0.5 m) from the skin of the vehicle 12. Preferably the measurements of atmospheric temperature and pressure occur in a range of about one half of a meter (0.5 m) to about three meters (3 m) from the skin of the aircraft. Even in distances less than about one half of a meter (0.5 m), the measurements are affected only by a minimal amount of turbulence.

At times between the pulses of light from the source 24, the outputs of the photomultipliers 36, 80 and 90 may be regulated. This may be accomplished by introducing pulses of light from a source 110 through optical fibers 112 to each of the multipliers 30, 80 and 90 at times between the pulses introduced to the source 24. The outputs of the photomultiplier tubes 30, 80 and 90 are then introduced to the microprocessor 56 in FIG. 3. The microprocessor 56 then adjusts the signals produced at the photomultiplier tubes 80 and 90 in accordance with the amplitudes of the signals produced in the photomultiplier tube 30 by the pulsing of the source 110. The microprocessor 56 also adjusts the output of each of the photomultiplier tubes 80 and 90 in accordance with the amplitudes of the signals produced in such photomultiplier tube by the pulsing of such tube by the source 110. In this way, the outputs of the photomultiplier tubes 80 and 90 ar made independent of any variations in the responses of the tubes so that the outputs of the tubes are dependent only upon the intensity of the light passing through the windows 22 and 18.

The apparatus constituting this invention has certain important advantages. It is able to measure temperatures accurately through a wide range of values such as temperatures between approximately $-100°$ C. and $+107°$ C. The apparatus is also able to measure pressures accurately between about one tenth (0.1) atmosphere and one and one tenth (1.1) atmosphere. The apparatus is able to provide these measurements with an error less than about one percent (1%). The apparatus is also instantaneously responsive to changes in temperature and pressure since the light source 24 is pulsed at a rate of approximately fifty Hertz (50 Hz).

The apparatus constituting this invention also has other advantages of some importance. For example, it provides the measurements of atmospheric temperature and pressure relatively close to the vehicle 12 without being affected by the atmosphere turbulence created by the movement of the vehicle. The apparatus is also able to make the measurements of temperature and pressure simultaneously from the same source of light, thereby minimizing the possibilities of error between the two (2) measurements.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for measuring the temperature and pressure of the atmosphere,
    means for directing ultraviolet light in a particular frequency range into the atmosphere for the scattering of the ultraviolet light by free molecules in the atmosphere and for the production of fluorescent light by the impingement of the light on particular molecules in the atmosphere,
    means responsive to the ultraviolet light scattered by the free molecules in the atmosphere for detecting such ultraviolet light to provide an indication of the pressure of the atmosphere, and
    means responsive to the fluorescent light produced by the impingement of the light on the particular molecules in the atmosphere for detecting such fluorescent light to provide an indication of the temperature of the atmosphere.

2. In a combination as set forth in claim 1,
    the light-directing means providing light in the range of approximately 185–200 nm,
    the detecting means for the ultraviolet light being operable in the range of approximately 185–200 nm, and
    the detecting means for the fluorescent light being operable in the range of approximately 210–260 nm.

3. In a combination as set forth in claim 2,
    means for providing for the passage of the fluorescent light only to the detecting means for the fluorescent light, and
    means for providing for the passage of the scattered light only to the means for detecting the scattered ultraviolet light.

4. In a combination as set forth in claim 2 wherein the combination is adapted to be disposed in a vehicle having an external skin,
    first means associated with the ultraviolet light means for directing the light in a progressively diverging beam through the skin of the vehicle,
    second means for directing the scattered ultraviolet light and the fluorescent light in a progressively converging beam through the skin of the vehicle, and
    the progressively diverging beam from the first means and the progressively converging beam from the second means focussing at a position outside the vehicle and removed by at least a particular distance from the skin of the vehicle.

5. In combination for measuring the temperature and pressure of the atmosphere,
    means for providing light in a particular wavelength band,
    means for directing the light in a diverging beam into the atmosphere for scattering of the light in the particular wavelength band by free molecules in the atmosphere and for a shift in the wavelength of the light as a result of irradiation of the light by particular molecules in the atmosphere,
    first detector means for detecting the light scattered in the atmosphere in the particular wavelength band,
    second detector means for detecting the light in the shifted wavelength band, and
    means for directing the scattered light in the particular wavelength band and the light in the shifted wavelength band to the first detector means and the second detector means in a converging beam.

6. In a combination as set forth in claim 5,
    means for inhibiting the passage to the first detector means of the light in the shifted wavelength band, and
    means for inhibiting the passage to the second detector means of the light scattered in the particular wavelength band.

7. In a combination as set forth in claim 5,
    the light-providing means providing light in a wavelength band of approximately 185–200 nm,
    the first detector means being responsive to light in a wavelength band of approximately 185–200 nm, and
    the second detector means being responsive to light in a wavelength band of approximately 210–260 nm.

8. In a combination as set forth in claim 5,
    means for respectively directing to the first and second detector means the light scattered in the particular wavelength band and the light in the shifted wavelength band.

9. In combination for measuring the temperature and pressure of the atmosphere,
    means for providing a source of pulsed light at a particular frequency in a particular wavelength passband,
    means for directing the pulsed light into the atmosphere for the production of a Rayleigh scattering of the light and of fluorescent light by particular molecules in the atmosphere,
    means responsive to the Rayleigh scattering of the light on the pulsed basis for producing first signals,
    means responsive to the fluorescent light on the pulsed basis for producing second signals, and
    means responsive to the first and second signals for processing such signals to provide indications of the temperature and pressure of the atmosphere.

10. In a combination as set forth in claim 9,
    means for inhibiting the introduction of the fluorescent light to the first signal means,
    means for inhibiting the introduction of the light in the Rayleigh scattering to the second signal means.

11. In a combination as set forth in claim 9,
    means for calibrating the light source, the first signal means and the second signal means at times between the production of the pulses of light by the light source to regulate the processing of the signals representing the Rayleigh scattering and the fluorescent light.

12. In a combination as set forth in claim 10, the combination being disposed in an enclosure having an external skin,
    means for calibrating the light source, the first signal means and the second means at times between the production of the pulses of light by the light source to regulate the processing of the signals representing the Rayleigh scattering and the fluorescent light,
    means associated with the light source for directing the light from the light source in a beam in a diverging path into the atmosphere from a position within the enclosure, and
    means for directing the light in the Rayleigh scattering and the fluorescent light into the enclosure to the first signal means and the second signal means in a beam with a converging path, the beam diverging path and the beam converging path having a focus at a position external to the enclosure and at least a particular distance from the skin of the enclosure.

13. In combination for measuring the temperature and pressure of the atmosphere, means for providing light in a particular wavelength band, means for directing the light into the atmosphere for Rayleigh scattering by the molecules in the atmosphere and for the production of fluorescent light by particular molecules in the atmosphere, means responsive to the light in the Rayleigh scattering for producing first signals indicative of such light, means responsive to the fluorescent light for producing second signals indicative of such fluorescent light, and means responsive to the first and second signals for processing such signals to indicate the pressure and temperature of the atmosphere.

14. In a combination as set forth in claim 13, the light providing means producing light in the wavelength range of approximately 185–200 nm, the first signal means being responsive to light in the range of approximately 185–200 nm, and the second signal means being responsive to fluorescent light in the range of approximately 210–260 nm.

15. In a combination as set forth in claim 14, means associated with the first signal means for filtering the fluorescent light from being introduced to the first signal means, and means associated with the second signal means for filtering the light in the Rayleigh scattering from being introduced to the second signal means.

16. In a combination as set forth in claim 15 wherein the combination is disposed in an enclosure dimensionally defied by an outer skin, first optical means for directing the light from the light providing means through the skin of the enclosure in a progressively diverging beam, and second optical means for directing the light in the Rayleigh scattering and the fluorescent light through the skin of the enclosure to the first signal means and the second signal means in a converging beam, the diverging and converging beams having a focal point removed externally from the skin of the enclosure by at least a particular distance.

17. In a combination as set forth in claim 13, means for regulating the light providing means, the first signal means and the second signal means to provide for variations in the first signals only in accordance with variations in the light in the Rayleigh scattering and to provide for variations in the second signals only in accordance with variations in the fluorescent light.

18. In combination for measuring the temperature and pressure of the atmosphere, a housing defined by external walls, there being first and second openings in the external walls of the housing, there being an inert gas in the housing with a particular pressure less than atmospheric, means in the housing for directing light in a particular wavelength band through the first opening in the housing for the Rayleigh scattering of the light in the particular wavelength band by molecules in the atmosphere and for the production of fluorescent light by particular molecules in the atmosphere from the light in the particular wavelength band, means in the housing for receiving the light passing in the Rayleigh scattering through the second opening and for producing first signals indicative of such received light, means in the housing for receiving the fluorescent light passing through the second opening and for producing second signals indicative of such fluorescent light, and means responsive to the first and second signals for processing such signals to indicate the temperature and pressure of the atmosphere.

19. In a combination as set forth in claim 18, means for regulating the light directing means and the first and second signal means to provide the first and second signals with characteristics independent of any variations in the characteristics of the light producing means and the first and second signal means.

20. In a combination as set forth in claim 18, the light directing means providing a progressively diverging light beam, means in the housing for directing the light in the Rayleigh scattering and the fluorescent light in a progressively converging beam to the first and second signal means, the progressively diverging light and the progressively converging light providing a focal point disposed outside of the housing and displaced from the first and second openings by at least a particular distance.

21. In a combination as set forth in claim 20, the light directing means providing light in a wavelength band of approximately 185–200 nm, the first signal means being responsive to light in the wavelength band of approximately 185–200 nm, and the second signal means being responsive to fluorescent light in a wavelength band of approximately 210–260 nm.

22. In a combination as recited in claim 21, means for regulating the light directing means and the first and second signal means to provide the first and second signals with characteristics independent of any variations in the characteristics of the light producing means and the first and second signal means, and means for producing the light in pulses at a particular frequency for direction by the light directing means into the atmosphere.

23. A method of measuring the temperature and pressure of the atmosphere, including the following steps:

directing light into the atmosphere in a particular wavelength band for a Rayleigh scattering of the light in the atmosphere and for the production of fluorescent light by the impingement of light on particular molecules in the atmosphere, measuring the light in the Rayleigh scattering to provide first indications, measuring the fluorescent light to provide second indications, and processing the first and second indications to provide outputs representing the pressure and temperature of the atmosphere.

24. A method as set forth in claim 23 wherein the light is directed into the atmosphere in a wavelength range of approximately 185–200 nm, the light in the Rayleigh scattering is measured in a range of approximately 185–200 nm, and the fluorescent light is measured in a range of approximately 210–260 nm.

25. A method as set forth in claim 23 wherein the light is directed into the atmosphere in a progressively diverging beam, and the light in the Rayleigh scattering and the fluorescent light are measured in a progressively converging beam, and the focal point of the progressively diverging beam and the progressively converging beam is at a position at least a particular distance from the housing.

26. A method as set forth in claim 25 wherein the light is directed into the atmosphere in a wavelength range of approximately 185–200 nm, the light in the Rayleigh scattering is measured in a range of approximately 185–200 nm, the fluorescent light is measured in a range of approximately 210–260 nm, the first indications are obtained substantially only by measuring the light in the Rayleigh scattering, and the second indications are obtained substantially only by measuring the fluorescent light.

* * * * *